United States Patent [19]

Inoue

[11] Patent Number: 4,999,557
[45] Date of Patent: Mar. 12, 1991

[54] INTEGRATION PROPORTIONAL CONTROLLER IN SERVO-CONTROL SYSTEM

[75] Inventor: Kenji Inoue, Ise, Japan

[73] Assignee: Shinko Electric Co., Ltd., Tokyo, Japan

[21] Appl. No.: 345,443

[22] Filed: Apr. 28, 1989

[30] Foreign Application Priority Data

May 2, 1988 [JP] Japan ................................. 63-107595
Sep. 9, 1988 [JP] Japan ................................. 63-224717

[51] Int. Cl.$^5$ ............................................. G05B 11/36
[52] U.S. Cl. ................................. 318/609; 318/610; 318/611; 364/162; 364/161; 364/183
[58] Field of Search .................... 318/609, 610, 611; 364/162, 161, 183, 184

[56] References Cited

U.S. PATENT DOCUMENTS 4,669,058  5/1987  Schneider et al. ................ 364/148
4,718,012  1/1988  Oshiage ........................... 364/161 X
4,733,149  3/1988  Culberson ........................ 318/561

*Primary Examiner*—William M. Shoop, Jr.
*Assistant Examiner*—Saul M. Bergmann
*Attorney, Agent, or Firm*—Flynn, Thiel, Boutell & Tanis

[57] ABSTRACT

An integration-proportional controller in a servo-control system comprises in one aspect, an integrator for integrating a deviation of an input speed reference signal from a feedback signal fed back from an object to be controlled, and a proportional amplifier connected with the integrator for amplifying the feedback signal, the integrator including a clamping function in which an output value therefrom and an initial value for the next successive integration are changed, when the output value as a result of integration of the deviation is out of a predetermined proper output region, to the nearest boundary of the predetermined region value. In another aspaect, a saturable integrator is provided for integrating a deviation of an input speed reference signal from a feedback signal fed back from an object to be controlled, a proportional amplifier is connected with the saturable integrator for amplifying the feedback signal, and a deviation clamping device is connected with the saturable integrator for limiting the upper and lower values of the deviation.

7 Claims, 8 Drawing Sheets

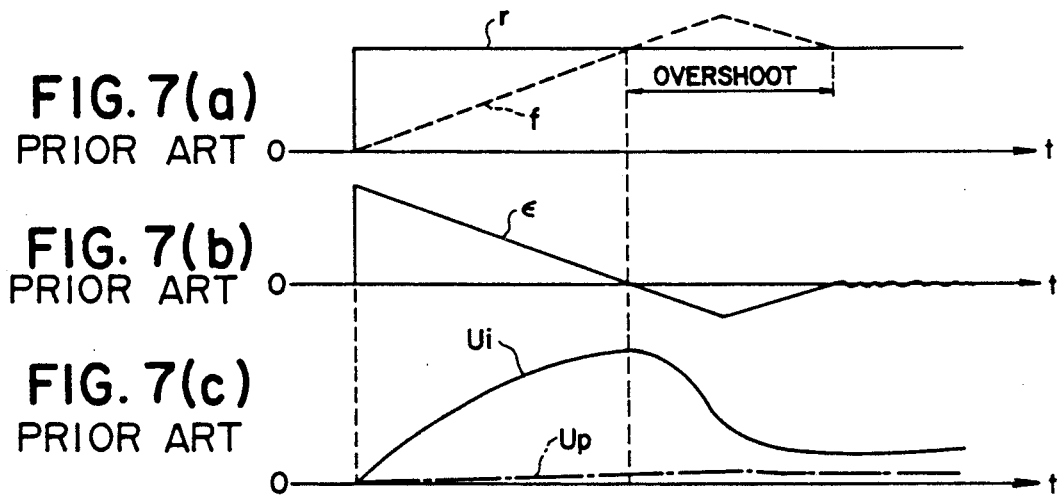
FIG. 7(a) PRIOR ART
FIG. 7(b) PRIOR ART
FIG. 7(c) PRIOR ART
FIG. 8 PRIOR ART
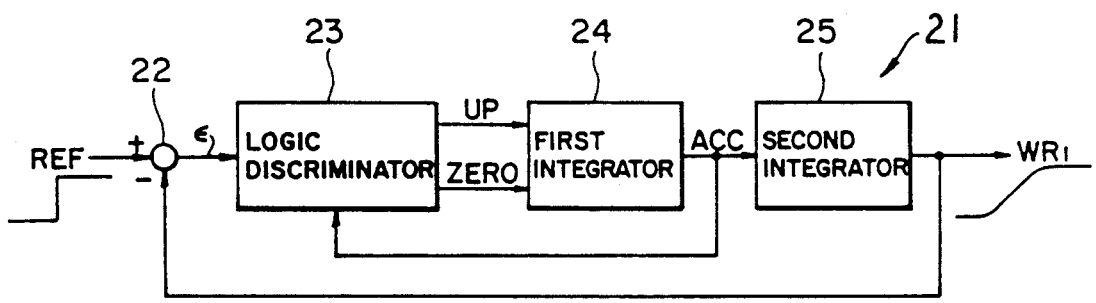

INTEGRATION PROPORTIONAL CONTROLLER IN SERVO-CONTROL SYSTEM

BACKGROUND OF THE INVENTION

1. Field of the Invention

The present invention relates to a servo-control system, and more specifically to an integration-proportional controller in such a servo control system which controls a servomotor for example, satisfactorily in reference-value follow-up characteristics, and disturbance suppressing characteristics, etc.

2. Description of the Prior Arts

It is conventional in a servo-control system to employ an integration-proportional controller in driving any load such as a motor for removing load vibration and improving the responsibility of the load. The integration-proportional controller (hereinafter simply referred to as I-P controller) is to control the servomotor rapdily and smoothly in response to a speed reference-value by amplifying a deviation between the reference-value and a feedback signal.

Referring here to FIG. 6, such a conventional integration-proportional controller in a servo-control system is illustrated.

In the figure, a speed reference signal r is inputted into the I-P controller 2 and branched at a first control junction point 4 of summing and/or differencing to an integrator 6 and from a proportional amplifier 8. Outputs Ui and Up each from the integrator 6 and the proportional amplifier 8 are outputted at a second control junction point 10. An output from the point 10 is supplied to a motor 14 for driving a load (not shown) through a motor drive control unit 16 for driving the motor 14. The output from the control function point 10 is a difference between the respective outputs Ui and Up from the integrator 6 and the proportional amplfier 8, and is limited within preset upper and lower limits. The angle of rotation f of the motor 14 is detected by a pulse generator 18 which then converts the detected angle to a pulse number per revolution time and supplies it to a speed detector 20.

Referring further to FIG. 7, timing charts of the respective control signals in the conventional integration-proportional amplifier are illustrated.

In the figure, when the speed reference signal r is applied in a stepwise manner with the angle of rotation f of the motor 14 being zero, for example, as illustrated in FIG. 7(a), the aforementioned deviation ε (ε=r−f) is as illustrated in FIG. 7(b), which causes an increase of the output Ui from the integrator 3 as illustrated in FIG. 7(c).

The output Ui from the integrator 6 increases without interruption until the rotation angle of the motor 14 is equal to the speed reference signal r, allowing the deviation to be negative thereafter, followed by the output Ui of the integrator 3 decreasing, after a while to a certain constant value.

Here, the conventional I-P compensator 2 has a drawback as follows.

With the speed reference signal r being larger or with the inertia of the motor 14 being greater, or with the upper limit of the motor drive control unit 16 being low, the I-P controller 2 has much time to return in its original state. In such a situation where the output Ui from the integrator 3, which has received the large deviation ε and kept its integration operation over a long period of time, becomes a very large value, suffering from taking much time to return to the normal value even if the motor 14 reaches the speed reference signal r and the deviation ε is reversed in its polaritY. This delays the return of the I-P controller 2 to its original state, thus further delaying the response of the control.

Here, another situation of the conventional I-P controller will be described with reference to FIGS. 8 through 10. When a servomotor is coupled with a mechanical unit to drive the latter, a stepwise speed reference signal is applied to the I-P controller as described previously. The mechanical output of the servomotor increases rapidly to transmit the torque to the mechanical unit very rapidly. This causes mechanical vibration on the mechanical unit because of its gear backlash, deformation of a shaft, and deflection of a belt, etc. To solve such a problem, an S-shaped instruction signal generator is conventionally available which converts the stepwise instruction signal to a smoothly changing instruction signal.

Referring here to FIG. 8 such S-shaped speed reference signal generator 21 is illustrated.

In the figure, a speed reference signal REF is inputted into the S-shaped speed reference signal generator 21 at a junction point 22 where it is subtracted by a feedback signal fb into a deviation signal ε. The deviation signal is fed to a logical discriminator 23 which issues a Up or ZERO signal at its output terminal UP or ZERO depending upon a feedback signal ACC issued from a first integrator 24 after receiving the UP or ZERO signal from the logic discriminator 23. An output ACC from the first integrator 24, which partly forms the aforementioned feedback signal ACC, is fed to a second integrator 25. The second integrator 25 issues the aforementioned feedback signal fb to the junction point 22 on one side and an instruction signal WR to a servomotor control unit (not shown but described later) on the other hand. The instruction signal WR is to control the servomotor control unit.

Referring to FIG. 9, output waveforms at respective portions of the S TM shaped speed reference signal generator 21 are illustrated for description of the operation of the generator 21.

In the figure, with the speed reference signal REF being inputted to the generator 21 at the branch point 22 to cause the deviation signal ε to rise with the same amplitude as that of the speed reference signal REF, the terminal Up of the logical discrimiator 23 is activated to permit the ouput ACC from the first integrator 24 to rise in a ramp waveform at time t0. When the output reaches a predetermined value B at time t1, the terminal Up of the logical discriminator 23 is inactivated to keep thereafter the ouput ACC at the predetermined value B. The speed reference signal WR from the second integrator 25 is increased during a time interval t0 to t1 drawing substantially a quadratic curve. When the deviation signal ε is decreased to satisfy a relation ε≦A (<B), the terminal ZERO of the logical discriminator 23 is activated, causing the ouput ACC to be decreased toward zero in a ramp waveform and hence the speed reference singal WR to be settled to the speed reference signal REF.

Referring in succession to FIG. 10, a positional servo-control system including the foregoing S-shaped speed reference signal generator is illustrated.

In the figure, an error amplifier 27 after receiving a position command signal 28 through a junction point 29 amplifies and ouputs it to an S-shaped speed reference signal generator 21. The S-shaped speed reference signal generator 21 outputs a smooth speed reference signal WR2 converted therein from the stepwise speed reference signal REF to a servomotor control unit 31, which corresponds to the motor drive control unit 16 of FIG. 6. The servomotor control unit 31 hereby controls a motor 32, the rotation of which motor is transmitted to a pulse generator 33 and to a load 34. The pulse generator 33 feeds back a feedback signal 36 to the junction point 29 and to a speed detector 35.

Hereupon, the S-shaped speed reference signal generator 21 described above has a drawback that the generator, which might often be incorporated into the control loop as described above referring to FIG. 10, has basically an integration characterisitc. This causes the control system including the generator in its control loop to be unstable

SUMMARY OF THE INVENTION

In view of the drawbacks of the conventional I-P controller in a servo-control system, it is an object of the present invention to provide the I-P controller capable of assuring a good transient response by preventing unnecessary integration operation at its saturation.

Another object of the present invention is to provide an I-P controller in a servo-control system capable of exhibiting smooth output response characteristics upon a stepwise speed reference signal being inputted and of thereby smoothly regulating the output torque and the rotational speed of a servomotor without provision of a conventional S-shaped speed reference signal generator.

To achieve the above objects, an I-P controller according to the present invention includes in one aspect saturable integrator means with a predetermined gain for integrating a deviation of an input speed reference signal from a feedbackk signal fed back from an object to be controlled, proportional amplifier means connected with the saturable integrator means for amplifying the feedback signal, and deviation clamper means provided on the input side and connected to the saturable integrator for adjustably limiting the upper and lower values of the deviation.

An I-P controller according to the present invention includes in the other aspect integrator means with a predetermined gain for integratng a deviation of an input speed reference signal from a feedback signal fed back from an object to be controlled, and proportional amplifier means connected with the integrator means for amplifying the feedback signal, the integrator means including a clamping function taking an ouput value therefrom when an evaluated value as a result of integration of the deviation is out of a predetermined region as well as an initial value for the next integration as a boundary value of the predetermined region located in the vicinity of the evaluation result.

The above and other objects, features and advantages of the present invention will become more apparent from the following desciption when taken in conjucntion with the accompanying drawings in which preferred embodiments of the present invention as shown by way of illustrative exmaple.

BRIEF DESCRIPTION OF THE DRAWINGS

FIGS. 7a-7c are timing charts at respective constituent portions of the conventional I-P controller illustrating the operation of the same;

FIG. 8 is a block diagram illustrataing an S-shaped speed reference generator assembled in a conventional positional servo system;

DESCRIPTION OF THE PREFERRED EMBODIMENT

In what follows, preferred embodiments of an I-P controller in accordance with the first and second aspects of the present invention will be described with reference to the accompanying drawings.

Figure 1:
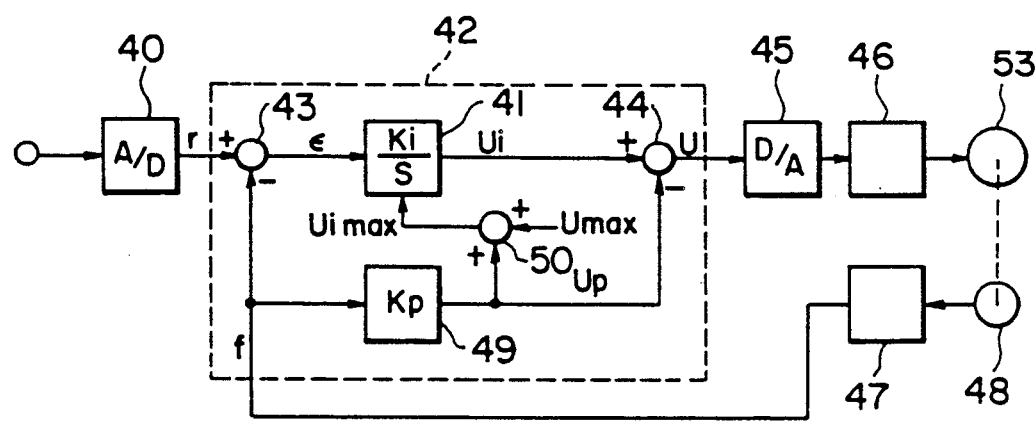
FIG. 1 is a block diagram illustrating an embodiment of an I-P controller with the first aspect of the present invention.

Referring to FIG. 1, the embodiment of the I-P controller in accordance with the first aspect of the present invention is illustrated in a block diagram. The embodiment is particularly adapted to improve its responsibility to an input speed reference signal.

In the figure, an input speed reference signal r is converted by an analog-to-digital converter (hereinafter, referred to as an A/D converter) 40 to a corresponding digital speed reference signal r. The digital speed reference signal r is inputted into a clamping integrator 41 in the I-P controller 42 through a junction point 43 which performs summing and differencing for automatic control. The clamping integrator 41 has a function to previously receive instructions indicative of a range of any integrated value outputted therefrom to correct any result of the integration so as not to be out of the foregoing range. An output U from the I-P controller 42 is outputted to an external load i.e., a motor 53 through a junction point 44, a digital-to-analog converter (D/A converter) 45 and driving control unit 46. The rotation of the motor 53 is detected by a speed detector 47 through a pulse generator 48 and fed back as a feedback signal f to the first junction point 43 and to a proportional amplifier 49 which proportional amplifier has a differencing function. An output from the proportional amplifier 49 is fed to the clamping integrator 41 through a third junction point 50 as a value to set the upper limit of the output Ui from the clamping integrator 41 on one side while being fed to the second junction point 44 as Up on the other hand. The third junction point is supplied besides the output Up from the propotional amplifier 49 with a saturation signal Umax from the motor driving control unit 46 indicative of saturation of the same. Here, the I-P controller 42 is a digital computer (not shown) operating under one of various possible control programs.

Figure 2:
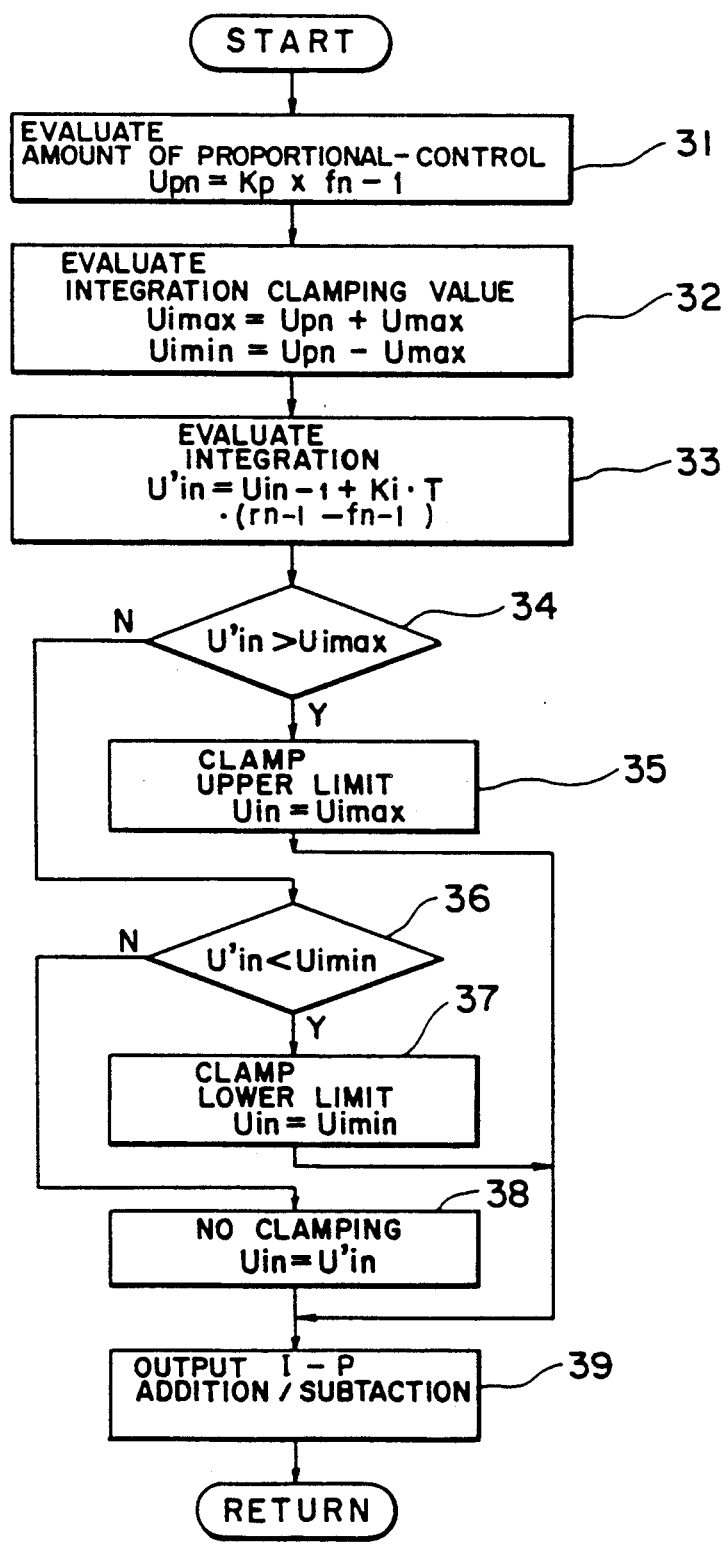
FIG. 2 is a flow chart illustrating the operation of the embodiment of FIG. 1.

FIG. 2 illustrates a flow chart of the control program of the I-P controller 42.

In step 31, the I-P controller 42 receives the feedback signal f, a measured speed signal fed back from the speed detector 47 and evaluates the amount of proportional-control Upn, as follows:

$$Upn = Kp \times fn-1,$$

where

Upn is the output from the proportional amplifier 49;
Kp is the gain of the same; and
fn−1 is the speed of the motor 43 at time unit n−1.

In Step 32, it evaluates an integration clamping value, as follows:

$$Uimax = Upn + Umax,$$

and $$Uimin = Upn - Umax,$$

where

Uimax is a value to set the upper limit of the output Ui from the clamping integrator 41;
Uimin is a value to set the lower limit of the same; and
Umax is a saturation signal from the motor driving control unit 46 indicative of saturation of the same.

In Step 33, it evaluates integration as described below:

$$U'in = Uin-1 + Ki \cdot T \cdot (rn-1-fn-1)$$

U'in is the output Ui from the clamping integrator 41 before its clamping operation;
Uin−1 is the output Ui from the same but after its previous clamping;
Ki is the gain of the clamping integrator 41
T is the unit time length
rn−1 is the speed reference signal.

in Step 34, it checks U'in > Uimax, and if not so, goes to Step 36.

In Step 35, if so, it clamps the upper value and sets the output Uin from the clamping integrator 41 to the constant Uimax as follows:

$$Uin = Uimax,$$

where

Uin is the output Ui from the clamping integrator 41 after its clamping.

In Step 36, it checks U'in < Uimin, and if not so, goes to Step 38. If so, in Step 37, it clamps the lower value and sets the output Uin from the clamping integrator 41 to the constant Uimin as follows:

$$Uin = Uimin.$$

In Step 38, Uin is output without effecting any clamping such that:

$$Uin = U'in.$$

In Step 39, it executes addition/subtraction of the proportional output Up and the integration output Ui, thereby outputting the control signal U, as follows:

$$U = Uin - Upn.$$

where

U is the integration-proportional control output.

Operation of the embodiment of the I-P controller 42 arranged as described above is as follows.

Figure 3:
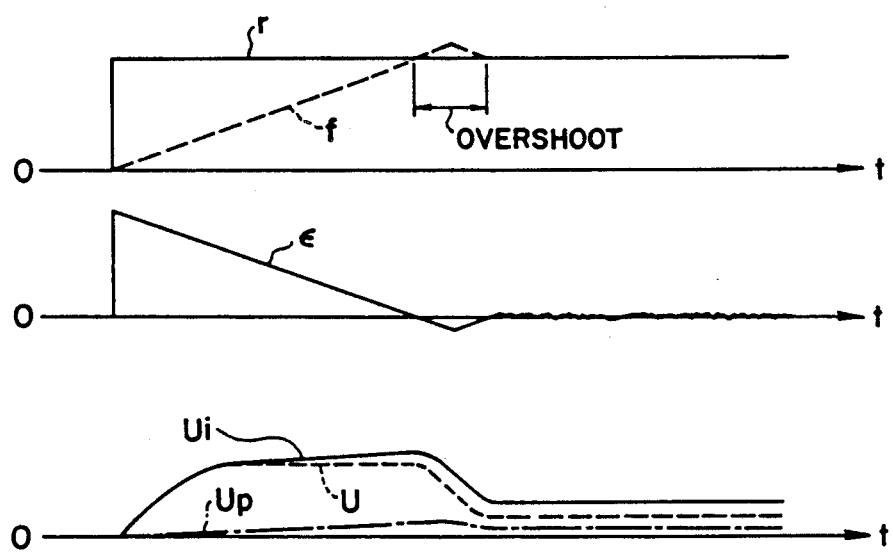
FIG. 3 is a timing chart at respective constituent portions of the embodiment of FIG. 1 illustrating the operation of the same.

Referring to FIG. 3, illustrating a timing chart of the control signals at the respective portions of the embodiment, with the speed reference signal r inputted stepwise into the device, the deviation ($\epsilon = r-f$) is greatly shifted to the positive side to permit the integration result U'i to be increased. However when the integration result U'i gets larger than the predetermined value Uimax, the output Ui of the clamping integrator 41 is made the constant Uimax without being further increased. The output Ui of the clamping integrator 41 is taken as an initial value for the successive integration, and the output of the successive integration is defined to be shifted toward the center of a predetermined range from the predetermined value Uimax immediately after the polarity of the deviation $\epsilon$ is reversed. The predetermined value Uimax is calculated and set such that an output value into the driving control unit 46 becomes Umax (saturation input value).

Once the speed f of the motor 7 reaches the speed reference signal r, the output Ui of the clamping inegrator 41 and the output U of the I-P controller 42 start to be decreased, whereby the speed of the motor 53 is settled after an overshoot interval which is much shorter than the conventional case.

In accordance with the I-P controller 42 according to the present embodiment as described above, the integrator output during the clamping inteval is restricted by the saturation input value into the motor driving control unit + the output value of the proportional amplifier, whereby the integrator output is rapidly released from the saturation compared with the conventional case followed by the reduced overshoot and the improved responsibility.

Here, although the present embodiment was applied to the integrator in the I-P contoroller, the present invention may be applied to an integrator in a I-P controller (such as the proportional amplifier 49 of FIG. 1 but with a differentiating fuction) or to those in over temperature control, etc., except for the servomotor control of the type described above, thereby improving responsibility of the system in the same manner as in the present case.

In succession, an I-P controller of another embodiment according to the second aspect of the present invention will be described with reference to FIGS. 4 and 5. The like symbols will be applied to the like portions as in the previous embodiment.

Figure 4:
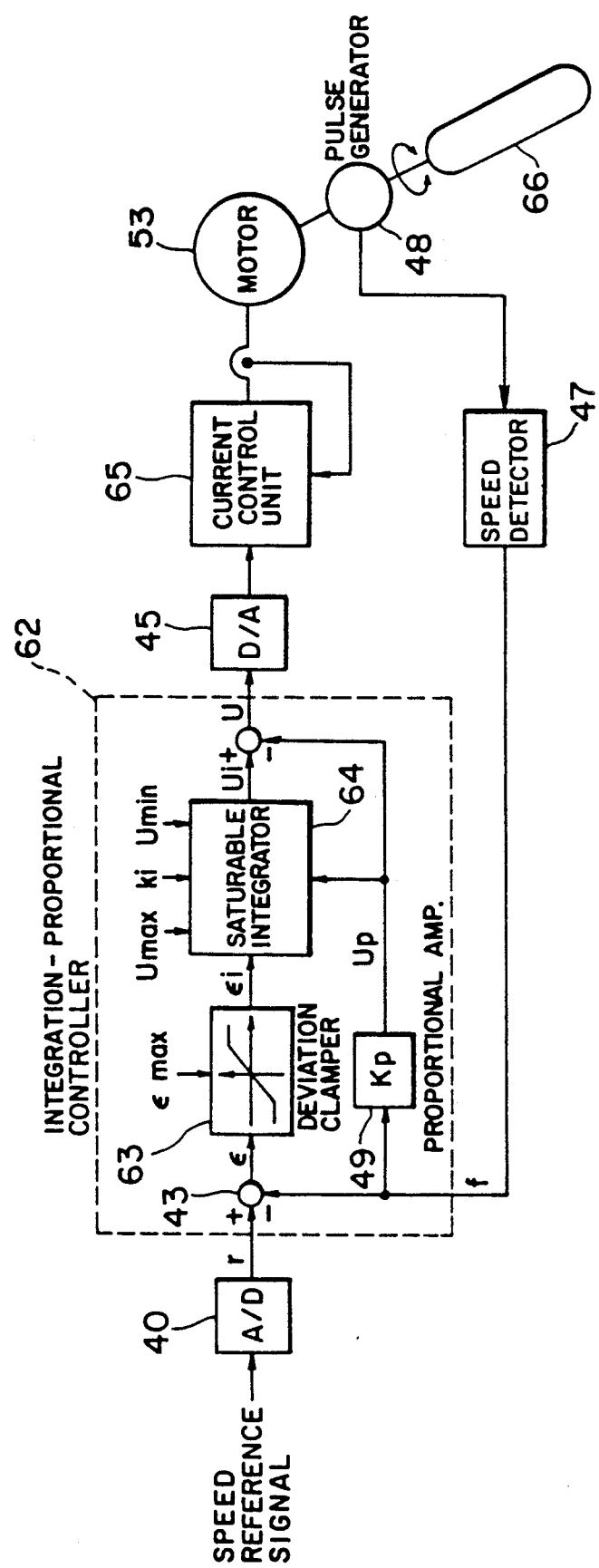
FIG. 4 is a block diagram illustrating an embodiment of an I-P controller associated with the second aspect of the present invention.

Referring to FIG. 4, illustrating a block diagram of the embodiment, a stepwise speed reference signal is converted to a digital speed reference signal r by an A/D converter 40. The digital speed reference signal r is inputted into the I-P controller 62. The I-P controller 62 comprises a deviation clamper 63, a saturable integrator 64, and a proportional—amplifier 49. A control output U from the I-P controller 62 is supplied to a motor 53 through an A/D converter 45 and a current control unit 65. The rotation of the motor 53 is transmitted to a load 66 and detected by a speed detector 47 via a pulse generator. The detected speed signal is fed back as a feedback signal f to a first junction point 43 on one side and to the propotional amplifier 49 on the other hand. Here, the I-P controller 62 is realized by a microcomputer (not shown) as a result of numerical computation thereby.

The deviation clamper 63 restricts its output $\epsilon i$ to a clamped value $\epsilon max$ when a deviation $e$ between the speed reference signal r and the feedback signal f is larger than the clamped value $\epsilon max$, so as to satisfy a relation $\epsilon i < \epsilon max$.

The saturable integrator 64 has upper and lower set values Umax and U min, exhibiting a saturation characteristic which has upper and lower clamper values Uimax(n) and Uimin(n) described below. Here, n is the number of times of sampling. With an output Up from the proportional amplifier 49:

$$Uimax(n) = Up(n) + Umax(n) \quad (1)$$

$$Uimin(i\ n) = Up(n) + Umin(n) \quad (2)$$

$$Up(n) = Kp \cdot f(n-1) \quad (3)$$

Here, Kp designates a gain of the proporitional amplifier 49. Then, an integrated value Ui by the saturable integrator 64 is evaluated on the basic of the following equation (4).

$$Ui^*(n) = Ui(n-1) KixTxei(n) \quad (4)$$

Here, T denotes a sampling period. The evaluated value is taken as an initial value for the successive integration. The saturable integrator 64 outputs the upper limit value Uimax(n) when the integrated value Ur*(n) exceeds the upper limit value Uimax(n). Likewise, it outputs the lower limit value Uimin(n) when the integrated value Ui*(n) is less than the lower limit value Uimin(n), and outputs the integrated value Ui(n) when there holds a relation Uimax(n) Ui*(n) Uimax(n). Thus, the I-P controller 62 provides its output:

$$U(n) = Ui(n) - Up(n) \quad (6)$$

The I-P controller 62 thus prevents excess integrtion by the saturable integrator 64 and suppresses overshooting of the output U, thereby rapidly settling the motor 53 to the speed reference value because the output torque of the motor 15 is proportional to the above output U.

Figure 5:
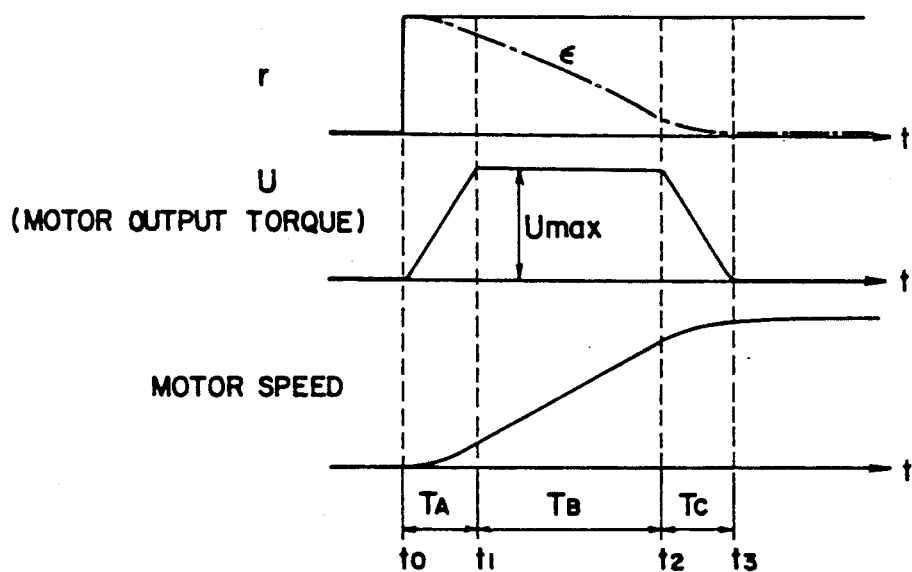
FIG. 5 is a timing chart at respective constituent portions of the embodiment of FIG. 4 illustrating the operation of the same.
Figure 6:
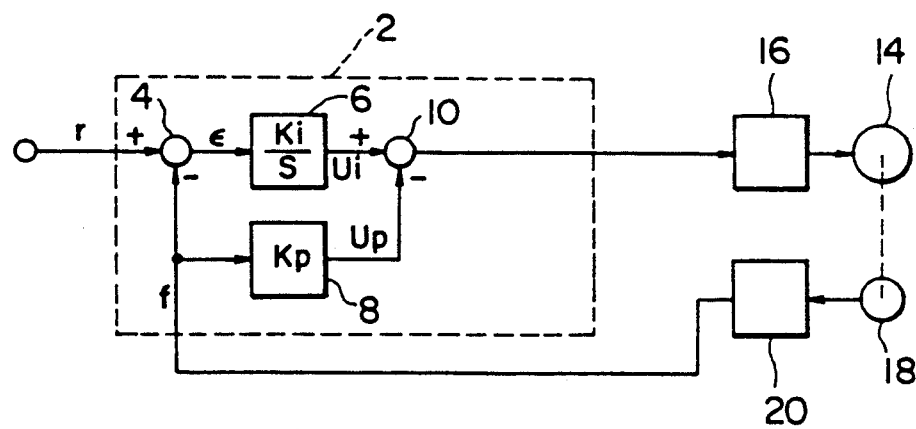
FIG. 6 is a block diagram illustrating a conventional I-P controller in a servo-control sytem.
Figure 9:
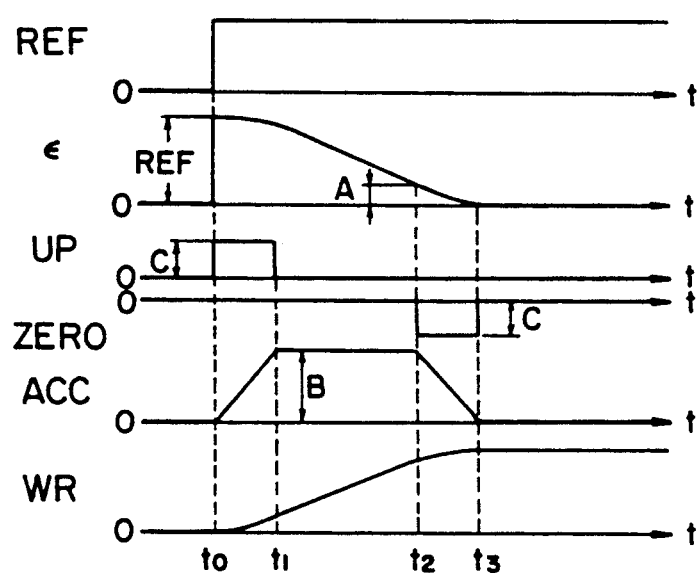
FIG. 9 is a timing chart at respective portions of the S-shaped speed reference signal generator of FIG. 8 illustrating the operation of the same.

Referring now to FIG. 5, illustrating a timing chart of the embodiment at respective portions of the same, the speed reference signal r is inputted at a time instant t0. But, here is assumed $r > \epsilon max$ and $f = 0$. The output Ui of the saturable integrator 64 is increased at a rate in response to the deviation $\epsilon max$. Although the rate is higher as the input ei increased, since $\epsilon max$ is restricted in the present embodiment, it is gradually raised compared with the prior art case where no deviation clamper 63 is provided and the speed reference signal r is directly inputted, thereby assuring the speed of the motor 53 is increased in correspondence with a quadratic curve. With the elapse of a time interval TA, the output U of the I-P controller 62 is clamped to Umax, a constant value, and thereafter the motor speed is linearly increased. With the elapse of a time interval TB to time instant t2 the deviation $\epsilon$ becomes less than the clamper value $\epsilon max$ to reduce a downward slope of the output Ui of the saturable integrator 64, hereby setting the speed f of the motor 53 to the speed reference value r.

In deceleration, since the downward slope of the output Ui of the saturable integrator 64 is restricted to $\epsilon max$, the motor 53 is smoothly decelerated, and since the stationary value of the output Ui becomes the lower set value Uimin, the same operation as in the foregoing acceleration is assured.

In accordance with the present embodiment, as described above, the I-P controller 62 allows the input $\epsilon i$ to be restriced to $\epsilon max$, so that the step response output from the I-P controller 62 can be smoothed so as for the output torque of the motor 53 not to exert a sudden change to the load, thereby preventing the load from producing thereon any vibration upon its start and stop operation.

Additionally, in accordance with the present embodiment, the upper and lower set values Umax and Umin imposed on the saturable integrator 64 can be altered to adjust the upward/downward slope of the motor 53, and hence to change the time required for the start and stop operations of the motor 53.

Figure 10:
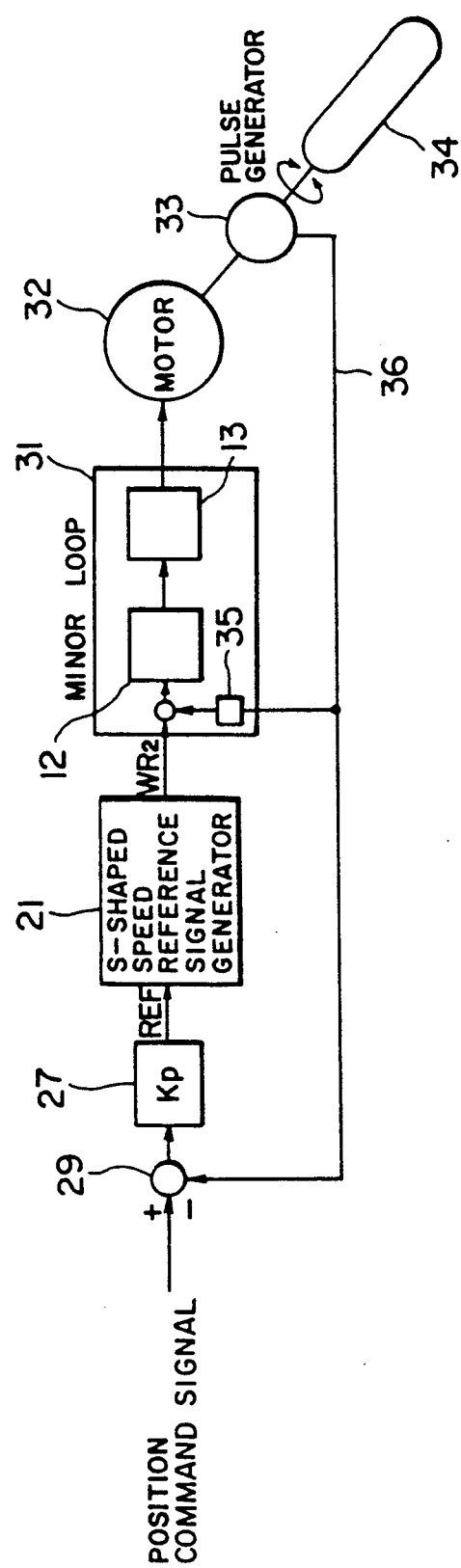
FIG. 10 is a block diagrm of the positional servo system of FIG. 9.

The I-P controller 62 of the present embodiment sets with ease torque slopes in acceleration and deceleration and maximum values thereof as in the aforementioned S-shaped instruction signal generation. For example, it can not only prevent the motor load (such as a mechanical unit including gears, etc.) from producing any vibration thereon at start and stop operations without the use of the S-shaped signal generator 21 in the positional servo control system shown in FIG. 10, but can also adjust with ease the acceleration/deceleration torque slopes and the time required for the acceleration and deceleration of the motor, further contributing to the stabilization of the system because of the system not being a conventional integration system.

Although certain preferred embodiments have been shown and described, it should be understood that many changes and modifications may be made therein without departing from the scope of the appended claims.

What is claimed is:

1. An integration-proportional controller in a servo control system comprising:

means for producing a deviation signal which represents a deviation between an input speed reference signal and a feedback speed signal which has been fed back from an object to be controlled;

integrator means for integrating said deviation signal to produce a corresponding output signal;

proportional amplifier means coupled with said integrator means for amplifying said feedback signal and producing an amplified feedback signal, means connecting said amplifier means to said integrator means and responsive to said amplified feedback signal for setting output limit values which define therebetween a proper output value range for said output signal of said integrator means, and means for producing a control signal for said object to be controlled by subtracting said amplified feedback signal from said output signal of said integrator means; and said integrator means including clamping means for clamping said output signal of the integrator means to one of said output limit values when an output value of said output signal is out of said proper output value range and is closer to said one output limit value than to the other said output limit value.

2. An integration-proportional controller according to claim 1, wherein each of said aforementioned means includes a programmed digital computer.

3. An integration-proportional controller according to claim 1, wherein said integrator means includes means for using a first output value of said output signal as an initial value for producing a successive output value of said output signal.

4. An integration-proportional controller according to claim 1, wherein said proportional amplifier has a differencing function.

5. An integration-proportional controller in a servo-control system comprising:
   means for producing a deviation signal representing a deviation between an input speed reference signal and a feedback speed signal which has been fed back from an object to be controlled;
   saturable integrator means having a saturation characteristic for integrating said deviation signal to produce a corresponding output signal;
   proportional amplifier means connected with said saturable integrator means for amplifying said feedback signal to produce an amplified feedback signal, said saturable integrator means including limit means responsive to said amplified feedback signal for defining upper and lower clamping values for said output signal of said saturable integrator means, and said controller having means responsive to said amplified feedback signal for producing a control signal for said object to be controlled;
   deviation clamper means for limiting said deviation signal to a range between upper and lower values of said deviation; and
   said saturable integrator means including means defining upper and lower set values which are indicative of said saturation characteristic thereof, said limit means including means for using said upper and lower set values and said amplified feedback signal to define said upper and lower clamping values to fall within a range based on a difference between said upper and lower set values.

6. An integration-proportional controller according to claim 5, wherein each of said aforementioned means includes a microcomputer.

7. An integration-proportional controller according to claim 5, wherein said deviation clamper means includes means for adjusting said upper and lower values of said deviation.

* * * * *